Oct. 15, 1963       A. C. McDONAGH       3,106,812
SAFETY GUARD FOR POWER LAWN MOWER
Filed May 5, 1961                     2 Sheets-Sheet 1

INVENTOR
Andrew C. McDonagh
By Hooper, Leonard & Buell
his Attorneys

Oct. 15, 1963

A. C. McDONAGH 3,106,812

SAFETY GUARD FOR POWER LAWN MOWER

Filed May 5, 1961

INVENTOR
Andrew C. McDonagh

Hooper, Leonard & Buell
his attorneys

United States Patent Office 3,106,812
Patented Oct. 15, 1963

3,106,812
SAFETY GUARD FOR POWER LAWN MOWER
Andrew C. McDonagh, 3586 Mount Troy Road,
Pittsburgh 12, Pa.
Filed May 5, 1961, Ser. No. 108,067
1 Claim. (Cl. 56—25.4)

This invention relates to a safety device or guard for power lawn mowers and more particularly for rotary blade type power lawn mowers.

A chronic and very serious problem that has plagued the rotary power lawn mower industry since its inception has been the staggering number of injuries to persons using such lawn mowers resulting from flying stones, sticks, pieces of wire or glass etcetera, that are flung by the mower as it moves over the surface of the ground and the accidental slipping of the operator's foot under the mower carriage into the whirling blades thereof. A report at page 241 of the June 1960 issue of Reader's Digest discloses that in the United States in 1959 alone, some 70,000 people were injured by lawn mowers and that most of these people were injured which operating rotary-type power lawn mowers.

Those skilled in the art have long recognized the above dangers and have for many years attempted to overcome them and have devised many various kinds of safety devices for such mowers. The principal objection to the safety devices aforementioned has been their inconvenience in that they impair the efficiency of the mower due, among other things, to clogging or matting of grass therein or by flattening the grass to be cut or that they hang-up on irregularities found in yards such as hummocks, clumps, hills and the like or that they fail to fully protect the operator thereof anyway.

I have invented a safety guard for rotary mowers that obviates much of the danger of such mowers to their operator as well as the inconveniences of prior safety guards.

I provide a guard for rotary lawn mowers comprising a shield member mounted on roller means, and attaching means adapted to pivotally attach said guard to a mower adjacent to and along the rear side thereof. This pivotal attachment permits the guard to move up and down over the terrain of the yard independently of the mower as it follows along behind the mower. Thus, as the mower is tilted forward or backward such as occurs from time to time according to the contour of the lawn, the safety guard pivots with respect to said mower and remains on the surface of the ground rolling along between the mower and feet of the operator continuously protecting him.

I further provide a releasable latching means adapted to fasten said guard to said mower in an upwardly pivoted disposition relative thereto whereby said guard is carried by said mower and does not move independently thereof. This permits the operator to fasten my guard rigidly to the mower whenever he desires such as for instance when he wishes to pick the mower up to put it away; latching the guard prevents it from flopping around during such times.

I further provide stop means adapted to limit the downward pivoting of said guard relative to said mower, whereby the guard is prevented from jack-knifing under the mower as when the operator is pulling the mower backwards toward himself and strikes an obstacle.

Other details, objects and advantages of the invention will become apparent as the following description of certain present preferred embodiments thereof proceeds.

In the accompanying drawings, I have illustrated certain present preferred embodiments of the invention in which—

Figure 1:
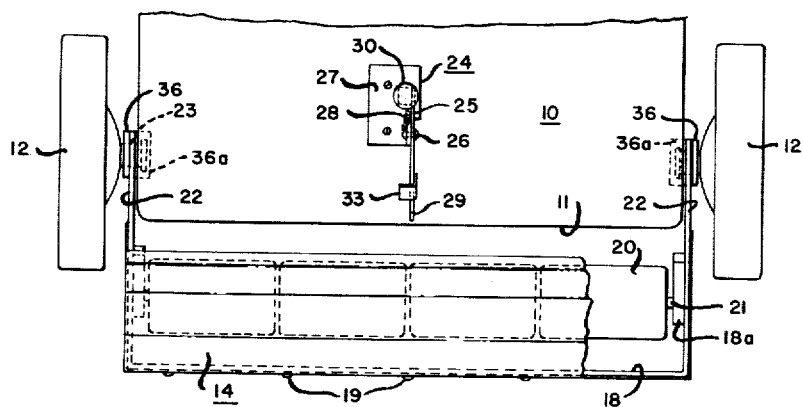
FIGURE 1 is a partial top plan view of a mower with my guard attached having portions thereof removed for clarity.
Figure 2:
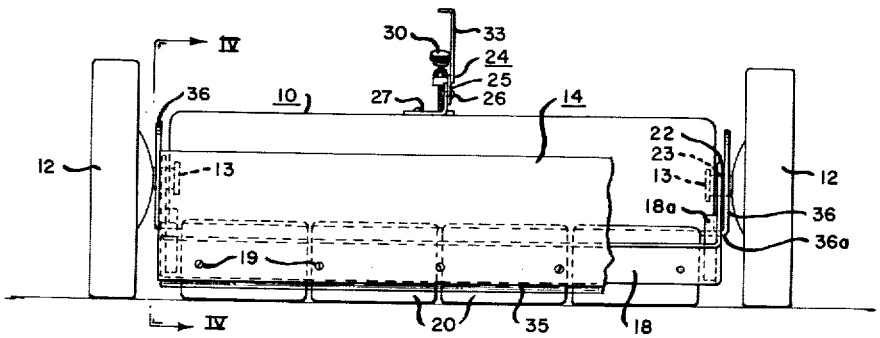
FIGURE 2 is a partial rear elevational view of a mower with my guard attached having portions thereof removed for clarity.

Referring now to the drawings, and initially to FIGURES 1 to 4, I show a rotary-type power lawn mower 10 with its rear side identified by reference numeral 11, and rear wheels by reference numeral 12 fastened on wheel shafts 13 of mower 10.

Figure 4:
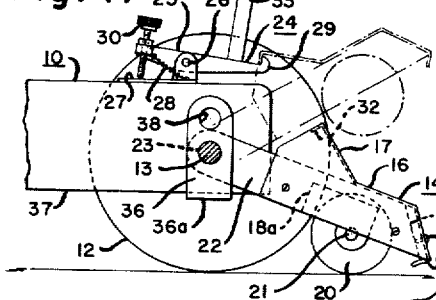
FIGURE 4 is a sectional view taken on the line IV—IV of FIGURE 2.
Figure 3:
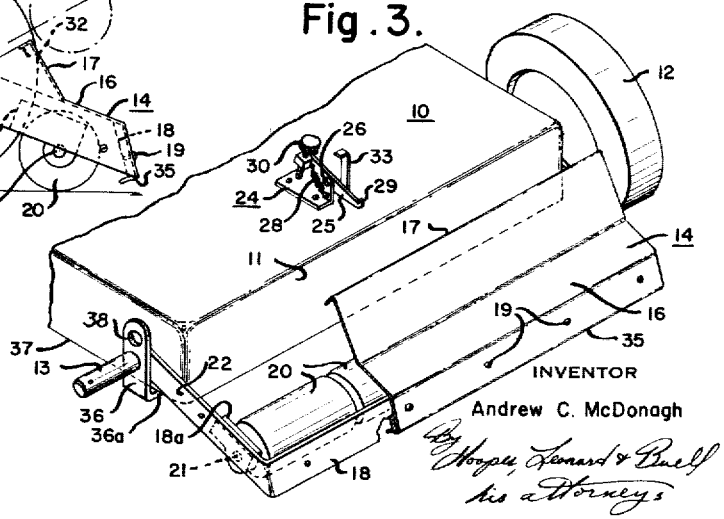
FIGURE 3 is an isometric view of the rear portion of a mower with my guard attached having portions thereof removed for clarity.
Figure 6:
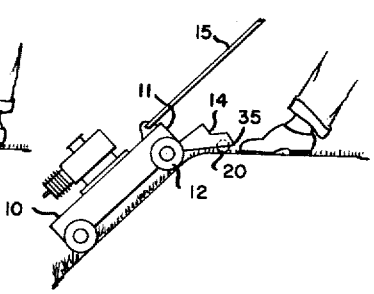

My safety guard 14, as there shown, is attached adjacent rear side 11 of mower 10 and extends substantially along the full length thereof to completely protect the operator who, of course, manipulates the mower from the rear side at handle 15 (see FIGURE 6). Safety guard 14 comprises a shield member 16 which preferably extends along the full length of rear side 11. As shown in FIGURE 4, shield member 16 further preferably extends from well above the lower edge of rear side 11 to very near the ground, the reasons for which will be explained later in the specification. Shield member 16 may be made up of sheet metal or a strong durable plastic hood portion 17 attached to a frame 18 such as by bolts 19. Shield member 16 is carried or mounted on rollers 20. This may be accomplished by means of supporting axle rod 21 (which passes through rollers 20 and upon which rollers 20 rotate) at its ends in support block 18a secured to frame 18 as shown in FIGURE 3. It is obvious that wheels or other equivalent means to rollers 20 could be employed to support my guard, but I prefer rollers 20 because they most completely close the opening to the mower blades at rear side 11 and further provide some beneficial rolling of the lawn as it is mowed. End portions 22 of frame 18 extend forward along each side of mower 10 and have an opening 23 in the end thereof to form a means of attaching my guard to the mower. This is readily accomplished as shown in FIGURE 3 by removing wheels 12, placing the ends of wheel shafts 13 through openings 23 of frame ends 22 and, of course, replacing wheels 12 on their shafts 13. It can be readily understood from the above description that frame ends 22 and consequently guard 14 itself will pivot about shafts 13 as mower 10 moves over the lawn. Preferably, the attaching frame ends 22 are of a length that positions guard 14 as close to rear side 11 as is practical remembering that it cannot be so close as to interfere with the guard's freely pivoting with mower 10 at frame end 22. Mower 10, as shown in this instance, is of a rectangular type, all sides of which are more or less straight; and therefore, frame ends 22 may be relatively short. Other types of mowers, however, may have sides taking a more circular configuration and the rear side may be curved. In such cases, obviously, frame ends 22 would have to be lengthened and hood portion 171 extended higher or otherwise appropriately adjusted to cover the rear opening of the mower. This would be merely a matter of adaptation to the particular mower and readily understood by those skilled in the art. Furthermore, there may be many other ways of attaching my guard to a mower such as by clamps pivotally attached to the guard, as will be recognized by those skilled in the art; the important feature of the attaching means being that it permits the guard to move in an up and down direction freely with respect to the mower, i.e., vertically independently, of the mower as it moves across the yard.

Figure 5:
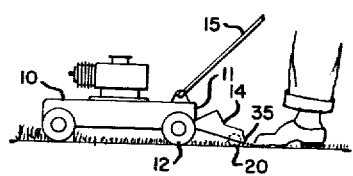
FIGURES 5, 6 and 7 are diagrammatic illustrations of my guard on a mower in various working attitudes.
Figure 7:
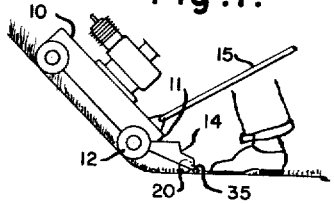

Referring now to FIGURES 5 to 7, the advantages of my invention over earlier safety guards become readily apparent. I there illustrate how my guard stays on the ground surface regardless of the tilting up and down of the mower. Other guards such as described in United States Patent Nos. 2,929,186 to Bundy and 2,934,882 to Kaut perfectly illustrate the point because they are rigidly attached to the mower and as the mower goes over the top of a hill section of lawn such as in FIGURE 6, their guards would raise with the tilting of the mower and the operator would be exposed to the dangers of flying stones, glass or whatever as well as his foot slipping thereunder. For further example, at the foot of a hill portion as shown in FIGURE 7, said prior guard would drag or hang up on the lawn as the mower is tilted backwards because said guards are rigidly attached to the mower. My guard 14 obviates such problems because it is pivotally attached to the mower and is thus free to move vertically independently of the mower and thus as illustrated in FIGURES 6 and 7, stays on the ground even as the mower tilts forward or backward to continuously protect the operator at all times as he pushes the mower along over the varied terrain and also obviates the dragging or hanging up as above described regarding prior guards.

It is further clarified in FIGURE 6, as to why it is preferable that hood portion 17 of shield 16 extends substantially higher than the bottom edge of rear side 11; for, as is apparent in FIGURE 6, if the shield were lower or only even with the bottom edge of rear side 11, the tilting forward of mower 10 would leave a gap or opening between the bottom edge of rear side 11 and upper edge of shield 16 which would endanger the operator. Thus, I preferably extend the upper edge of shield 16 to at least an inch or more above the bottom edge of rear side 11. The lower edge 35 of shield 16 I preferably extend to within an inch or less of the ground so that the operator cannot readily pull the mower with my guard attached back up over his foot; i.e., shield 16 will strike his foot and being so close to the ground will not ride up over it as readily as rollers 20. Note in FIGURES 4 and 5, that shield 16 is tilted forward so that if the operator's foot strikes it, his foot is inclined to go up over the guard instead of under it. Note also that lower edge 35 of shield 16 is curved or rolled inwardly and downwardly so that it will readily ride up over irregular ground when pulling the mower backwards, yet because edge 35 is so close to the ground, an obstacle as high as an operator's shoe will be inclined to go over the guard rather than under. However, even in the event that the guard somehow should ride up over the operator's foot, shield 16 would strike the operator's ankle and stop short before his foot could reach the mower blades.

When pulling the mower backwards, guard 14 will roll up over the lower obstacles and stop with the higher obstacles such as the operator's foot. Upon striking higher obstacles such as a stake sticking up out of the ground, the guard may try to jack-knife under the mower. To positively prevent any such jack-knifing, I provide, as shown in FIGURES 3 and 4, stop brackets 36 supported on each of shafts 13. The ends 36a of stops 36 extend under and bear against the lower edge 37 of the sides of the mower cover. Stops 36 are mounted outboard of the guard attaching frame ends 22 so that if the guard attempts to jack-knife, frame ends 22 strike stops 36 and arrest the jack-knifing. As is standard on many mowers, wheel shafts 13 are stub shafts that may be secured thereto in upper or lower position openings in the mower by which means the operator can raise or lower the cutting height of the mower. Thus I provide additional openings 38 in stops 36 adjacent the extra stub shaft openings provided for this purpose in the mower, so that regardless of the placement of shafts 13 on the mower for cutting height, stops 36 may be mounted on shafts 13 to function as earlier described. Stops 36 are preferably positioned to allow a substantial amount of downward pivoting of guard 14 in moving across a yard, yet stop the guard from jack-knifing beyond that point. It is thus apparent that my guard completely protects the operator while in operating position at the rear of the mower from any flying debris that may be thrown by the mower blades or from slipping his foot under the rear side of the mower.

I further provide a latch 24 whereby guard 14 may be latched to mower 10 in a raised position. This permits the operator to pull mower 10 back over curbs or up steps while rolling on wheels 12 as when putting it away or for whatever purpose, without interference from the guard. Of course, there are various ways that such latching may be accomplished. However, as illustrated in FIGURE 4, latch 24 in this embodiment comprises a latch bar 25 pivotally attached at reference 26 to support plate 27 attached to the cover of mower 10. Bar 25 is spring biased by the spring 28 to raise the hooked end 29 of bar 25. A lockable adjusting screw 30 at the other end from hooked end 29 of bar 25 bears on plate 27 and thus limits the amount hooked end 29 will raise. Flange 32, formed in the upper edge of hooded portion 17 of shield 16 is adapted to strike and depress hooked end 29 of latch bar 25 when guard 14 is lifted up to the chain line position shown in FIGURE 4. Thus as flange 32 passes beyond hooked end 29 spring 28 moves bar 25 back to its original position to engage hooked end 29 behind flange 32 and thus hold guard 14 in a raised position. The setting of adjusting screw 30 will of course, depend upon the cutting height setting of wheels 13 in the mower; so that hooked end 29 may be positioned to properly engage flange 32 regardless of the cutting height wheels 13 are set at. I further provide a handle 33 on latch bar 25 which when tugged by the operator depresses latch bar 25 and releases guard 14 from the latch.

Figure 8:
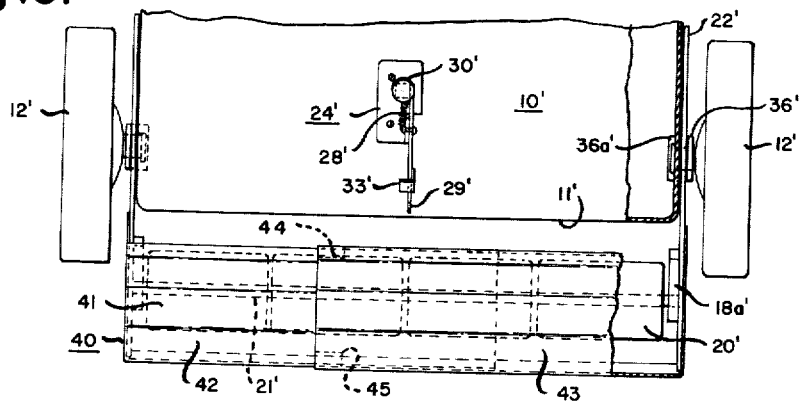
FIGURE 8 is a partial top plan view of a mower with another embodiment of my guard attached having portions removed for clarity.
Figure 9:
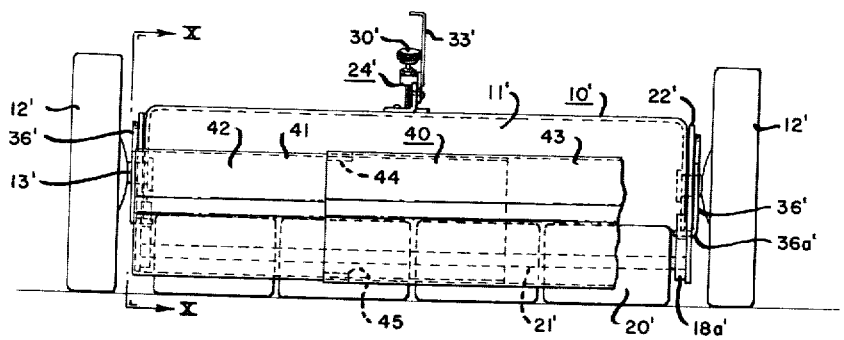
FIGURE 9 is a partial rear plan view of a mower with another embodiment of my guard attached having portions thereof removed for clarity.
Figure 10:
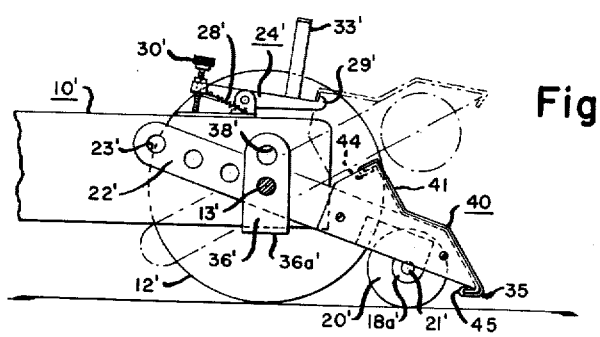
FIGURE 10 is a sectional view taken on the line X—X of FIGURE 9.

Referring now to FIGURES 8 to 10, I illustrate another embodiment of my invention which is adjustable to fit many of the various makes and sizes of rotary lawn mowers. The elements of this embodiment that are similar to my first described embodiment bear the same reference numerals with a prime sign added thereto. I render my invention more universally adaptable by providing a telescoping shield 40. The hood-like portion 41 is divided into two segments 42 and 43 with the segments 43 being larger and flanged to form channels 44 and 45 along its upper and lower edges respectively to receive the upper and lower edges respectively of the smaller segment 42 therein whereby the segment 42 may be telescoped into segment 43 to lengthen or shorten the guard as desired. Rollers 20' and likewise axle rod 21' would, if necessary, be cut to the desired length. Frame ends 22' are secured at each end of shield 40 and are adapted to be secured to the mower as earlier described with respect to the first preferred embodiment of my invention. Attaching frame ends 22' are lengthened to accommodate several openings 23' therein whereby the operator may select which openings 23' gives him the most practical degree of closeness between the guard and mower when attaching my guard thereto. This provides a great deal of flexibility in attaching my guard to mowers having different configurations.

While I have shown and described certain present preferred embodiments of the invention, it is to be distinctly understood that the invention is not limited thereto but may be otherwise variously embodied within the scope of the following claim.

I claim:

A guard for rotary lawn mowers and the like comprising roller means adapted to roll over a surface to be mowed, a shield member telescopically adjustable to length mounted on said roller means, selective fastening means adapted to pivotally attach said guard to a mower on a horizontal axis immediately adjacent the rear side thereof, stop means operable to limit downward pivoting of said guard whereby jack-knifing of said guard relative to said mower is prevented and releasable latching means adapted to fasten said guard to said mower in an upwardly pivoted disposition relative thereto, said shield member extending substantially above the open end at the rear of the mower and said shield member and said roller means extending the full length of said rear opening whereby the operator at the rear of the mower is completely shielded therefrom.

References Cited in the file of this patent

UNITED STATES PATENTS

| | | |
|---|---|---|
| 2,882,670 | Stephens | Apr. 21, 1959 |
| 2,973,613 | Hagedorn | Mar. 7, 1961 |
| 3,040,503 | Ogle | June 26, 1962 |

UNITED STATES PATENT OFFICE
CERTIFICATE OF CORRECTION

Patent No. 3,106,812                  October 15, 1963

Andrew C. McDonagh

It is hereby certified that error appears in the above numbered patent requiring correction and that the said Letters Patent should read as corrected below.

Column 1, line 22, for "which" read -- while --; line 37, for "operator" read -- operators --; column 2, line 15, before "removed" insert -- thereof --; line 70, for "171" read -- 17 --.

Signed and sealed this 21st day of April 1964.

(SEAL)
Attest:

ERNEST W. SWIDER

Attesting Officer

EDWARD J. BRENNER

Commissioner of Patents